United States Patent [19]
Sugiyama

[11] Patent Number: 6,141,379
[45] Date of Patent: Oct. 31, 2000

[54] APPARATUS AND METHOD OF CODING/DECODING MOVING PICTURE AND STORAGE MEDIUM STORING MOVING PICTURE

[75] Inventor: Kenji Sugiyama, Yokosuka, Japan

[73] Assignee: Victor Company of Japan, Ltd., Yokohama, Japan

[21] Appl. No.: 08/960,366

[22] Filed: Oct. 29, 1997

[30] Foreign Application Priority Data

Oct. 30, 1996 [JP] Japan .................................... 8-303943

[51] Int. Cl.⁷ ..................................................... H04N 7/18
[52] U.S. Cl. .......................... 375/240; 348/412; 348/413; 348/699; 348/700; 348/410
[58] Field of Search .................... 348/410, 411, 348/412, 413, 415, 416, 699, 700; 375/240.15

[56] References Cited

U.S. PATENT DOCUMENTS

| | | |
|---|---|---|
| 4,982,285 | 1/1991 | Sugiyama . |
| 4,985,768 | 1/1991 | Sugiyama . |
| 5,963,259 | 10/1999 | Nakaya et al. ............................ 348/416 |
| 5,999,219 | 12/1999 | Boon ........................................ 349/412 |
| 6,005,626 | 12/1999 | Ding ........................................ 348/416 |
| 6,005,627 | 12/1999 | Odaka et al. ............................ 348/413 |
| 6,011,870 | 1/2000 | Jeng et al. ............................... 348/416 |
| 6,014,173 | 1/2000 | Miyamoto ............................... 348/416 |

FOREIGN PATENT DOCUMENTS

| | | |
|---|---|---|
| 2-192378 | 7/1990 | Japan . |
| 4-105487 | 4/1992 | Japan . |

*Primary Examiner*—Andy Rao
*Attorney, Agent, or Firm*—Jacobson, Price, Holman & Stern, PLLC

[57] ABSTRACT

A moving picture coding and decoding apparatus performs inter-picture prediction with a plurality of reference pictures. In encoding, a first and a second predictive signal are respectively output by decimating pixels of a first and a second reference picture used for prediction. A predictive signal is subtracted from a coded picture signal to obtain a predictive residue signal. The predictive signal is formed by alternately selecting pixels not decimated of the first and the second predictive signals. The predictive residue signal is then encoded and output. In decoding, the coded predictive residue signal is decoded to reproduce the predictive residue signal. A third and a fourth predictive signals are output by decimating pixels of a third and a fourth reference picture used for prediction. Pixels not decimated of the third and the fourth predictive signals are alternately selected and added to the reproduced predictive residue signal to reproduce and output a picture signal.

10 Claims, 6 Drawing Sheets

| PICTURE TYPE → | I | B | B | P | B | B | P | B | B | I | B | B | P | B | B | P | B | B |
|---|---|---|---|---|---|---|---|---|---|---|---|---|---|---|---|---|---|---|
| REVERSION TYPE 1 → | | a | b | | a | b | | a | b | | a | b | | a | b | | a | b |
| REVERSION TYPE 2 → | | a | b | | b | a | | a | b | | b | a | | a | b | | b | a |

APPARATUS AND METHOD OF CODING/ DECODING MOVING PICTURE AND STORAGE MEDIUM STORING MOVING PICTURE

BACKGROUND OF THE INVENTION

The present invention relates to highly efficient coding/ decoding of moving picture to transform pictures into digital signals with less code amount and vice versa for effective moving picture transmission, storage and displaying. Particularly, this invention relates to highly efficient inter-picture predictive coding/decoding using pictures for bidirectional inter-picture prediction.

In inter-picture predictive coding of moving picture, highly efficient coding can be achieved using pictures as reference pictures that have already been coded and placed in time before and after pictures to be coded because a precise predictive signal can be produced. These pictures to be coded are called bidirectionally-predictive coded (B) frames (pictures).

This coding method is described in Japanese Patent Laid-Open No. 2(1990)-192378, "Interframe predictive coding system" filed by the same applicant of this invention. The B frames are also used in the moving picture coding system called MPEG that has been standardized by ISO/IEC.

The interframe predictive coding for coding the B frames always requires independent frames and one-directionally predictive frames. Because the B frames are frames always coded and never used for predicting other frames. The independent frames are called intra (I) frames that are coded without reference to other pictures. The one-directionally predictive frames are called predictive coded (P) frames that are coded from past intra or predictive coded frames.

Figure 1A:
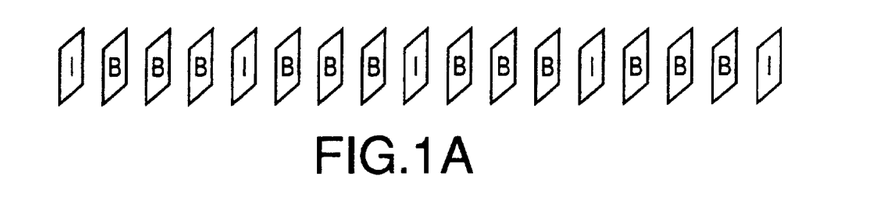
FIGS. 1A and 1B illustrate frame formats.
Figure 1B:
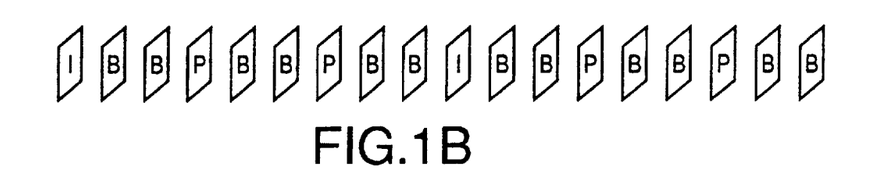

An image (picture) signal is composed of a plurality of frames with the I and B frames or I, P and B frames as shown in FIGS. 1A and 1B, respectively.

FIG. 1A illustrates the I frames placed in time at every fourth frame (usually, every fourth to sixth frame). The B frames placed in time inbetween two I frames are predicted by the I frames placed in time before (past) and after (future) the B frames.

FIG. 1B illustrates many of the B frames shown in FIG. 1A being replaced with the P frames. Usually, the I frames are placed in time at every tenth to thirtieth frame and the P frames at every second to fourth frame. In case of FIG. 1B, the coding/decoding processing is complicated and the frame binding length, or the frame unit to be accessed randomly becomes long; however, there are many interframe predictive frames so that the coding efficiency will be improved.

Figure 2:
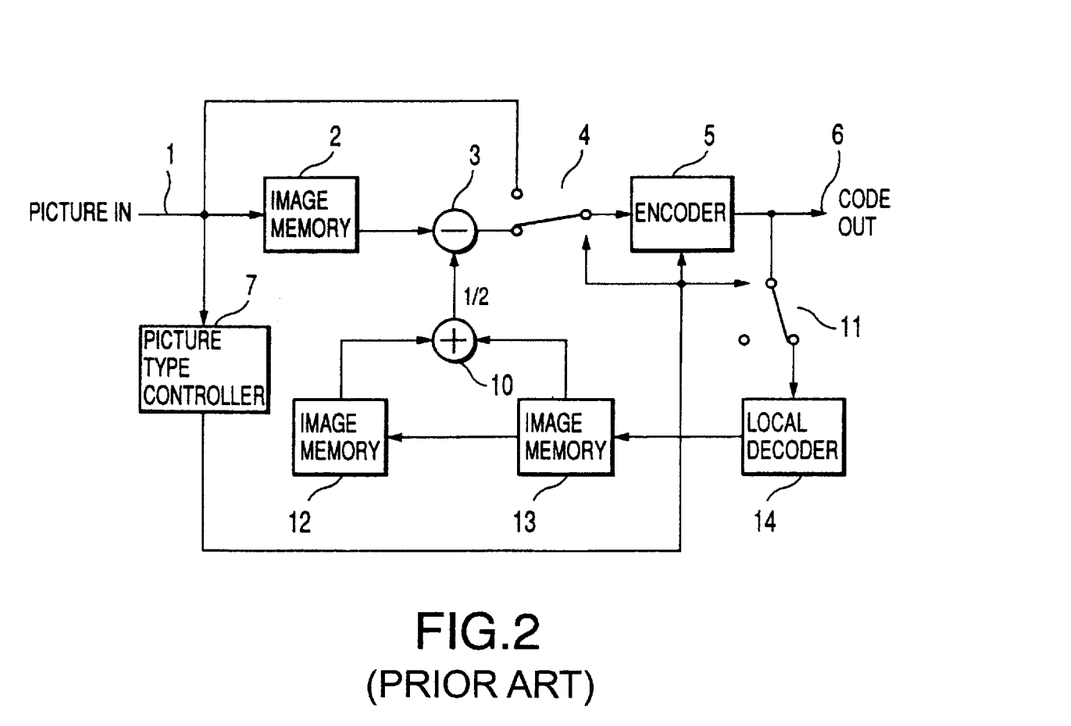
FIG. 2 shows a block diagram of a conventional coding apparatus.

FIG. 2 shows a block diagram of a conventional coding apparatus for processing I and B frames.

Image signals of moving picture are sequentially supplied to an image memory 2, a switch 4 and a picture type controller 7 via input terminal 1.

The picture type controller 7 sets the picture type of each frame by a predetermined period in synchronism with the input frames. More in detail, an every Nth frame is set as the I frame and the other frames the B frames. The picture type controller 7 then outputs the picture type information to the switch 4, an encoder 5 and a switch 11.

The image memory 2 stores an image signal of B frame among the image signals to delay the image signal by (N−1) frames. The delayed image signal of B frame is then supplied to a predictive subtracter 3. The delay is performed in order that an I frame used for prediction must be coded by the encoder 5 prior to the B frames to be predicted.

The predictive subtracter 3 subtracts a predictive signal from the image signal of B frame supplied from the image memory 2 to produce a predictive residual signal that is supplied to the switch 4. The predictive signal is supplied from an adder 10 as described later.

Under the control by the picture type information, the switch 4 selects and supplies the input image signal of I frame or the predictive residual signal to the encoder 5.

The encoder 5 transforms the selected signal by discrete cosine transform (DCT) and quantizes it to produce a variable-length coded signal. The coded signal is then output via output terminal 6.

In case of I frame, the coded signal of I frame is supplied to a local decoder 14 via switch 11 under the control by the picture type information.

The local decoder 14 performs dequantization and inverse-DCT to the coded signal of I frame to reproduce the image signal of I frame that is supplied to an image memory 13.

The image memory 13 stores and holds the reproduced image signal of I frame by one I frame and outputs the image signal to an image memory 12 when the next reproduced image signal of I frame is supplied thereto. The image memory 12 also stores and holds the reproduced image signal of I frame by one I frame. The image signals of I frame stored in the image memories 12 and 13 are supplied to the adder 10 for predictive coding of B frames.

The adder 10 adds pixel values of the image signals and divides the added result by two to produce the predictive signal that is supplied to the predictive subtracter 3.

The addition may be performed after the image signals are processed by weighting in accordance with the distance relationship between the I frames. Further, the adder 10 may not always perform addition in case of one-directional prediction per block or no prediction in accordance with similarity between a frame to be coded and frames to be used for prediction and placed in time before and after the frame to be coded. In this case, the encoder 5 decides the type of prediction in accordance with the similarity to output, per block, the prediction mode information.

Figure 3:
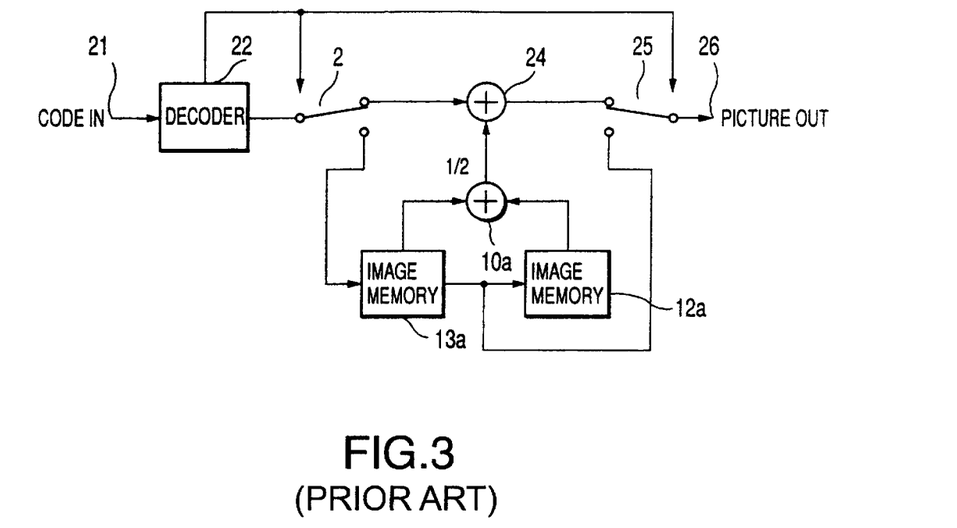
FIG. 3 shows a block diagram of a conventional decoding apparatus.

FIG. 3 shows a block diagram of a conventional decoding apparatus corresponding to the coding apparatus of FIG. 2.

A coded signal and prediction mode information are supplied to a decoder 22 via input terminal 21. The decoder 22 performs dequantization and inverse-DCT to the coded signal to reproduce and decode the image signal of I frame or predictive residual signal of B frame. The decoded signal is supplied to a switch 23. The prediction mode information is also decoded and supplied to the switch 23 and further to a switch 25.

Under the control of the predictive mode information, the switch 23 supplies the decoded image signal of I frame to an image memory 13a.

The image memory 13a stores and holds the decoded image signal of I frame by one I frame and outputs the image signal to an image memory 12a and the switch 25 when the next decoded image signal of I frame is supplied thereto. The image memory 12a also stores and holds the image signal of I frame by one I frame.

The image signals of I frame stored in the image memories 12a and 13a are supplied to an adder 10a for predicting decoding of B frames. The adder 10a adds pixel values of the image signals and divides the added result by two to produce the predictive signal that is supplied to a predictive adder 24.

Under the control of the predictive mode information, the decoded predictive residual signal is also supplied to the predictive adder 24 via switch 23. The predictive residual signal and the predictive signal are added to each other by the predictive adder 24 to reproduce the image signal that is supplied to the switch 25.

Under the control of the predictive mode information, the switch 25 selects the image signal of I frame stored in the image memory 13a or the reproduced image signal from the predictive adder 24. The selected image signal is output via output terminal 26. Here, the output signal from the output terminal 26 is composed of frames, the frame order of which is returned to that of the image signal input to the coding apparatus of FIG. 2.

Not only the bidirectional prediction described above, there are prediction methods using a plurality of pictures.

One is disclosed in Japanese Laid-Open Patent No. 4(1992)-105487, "Interframe predictive coding system" filed by the same applicant of this invention. The coding system adds past two fields or frames to each other for prediction. No delay processing is required in this system and hence there is no delay due to change in coding order that will occur when B frames are predicted. Another one is called as Dual' system in MPEG-2 to add past even and odd fields or frames to each other for prediction.

As described above, the inter-picture prediction performs addition of a plurality of pictures. Because the bidirectional prediction can follow picture change in time in interpolative prediction. Further, not only the bidirectional prediction, but other inter-picture predictions perform the addition of a plurality of pictures to restrict noise components involved in an input picture and other noise components produced through quantization. The addition of a plurality of pictures further has an effect of spatial filtering to improve prediction efficiency.

However, the inter-picture prediction using a plurality of reference pictures for prediction has the following drawbacks.

The inter-picture prediction adds two pictures to produce a predictive signal for prediction of one picture. This is why the inter-picture prediction requires two pixels of two reference pictures per pixel of one picture to be coded.

This means that the signal amount read from image memories that store reference pictures in inter-picture prediction will be double compared to such signal amount in prediction not using reference pictures. The pixel transfer rate between the image memories and prediction circuitry in the former prediction thus will be double compared to such transfer rate in the latter prediction. This results in that the inter-picture prediction requires data buses as a hardware that carry data of many bits.

SUMMARY OF THE INVENTION

An object of the present invention is to provide a moving picture coding and decoding apparatus and method that can achieve prediction efficiency near to prediction using a plurality of reference pictures with a pixel transfer rate the same as that of prediction using one reference picture.

Another object of the present invention is to provide a storage medium storing moving pictures coded by the coding apparatus.

The present invention provides a moving picture coding apparatus for performing inter-picture prediction with a plurality of reference pictures, comprising: a first predictor to output a first predictive signal by decimating pixels of a first reference picture used for prediction; a second predictor to output a second predictive signal by decimating pixels of a second reference picture used for prediction; a predictive subtracter to subtract a predictive signal from a coded picture signal to obtain a predictive residue signal, the sequential predictive signal being formed by alternately selecting pixels not decimated of the first and the second predictive signals; and an encoder to encode the predictive residue signal and output the coded predictive residue signal.

Further, the present invention provides a moving picture coding and decoding apparatus for performing inter-picture prediction with a plurality of reference pictures, comprising a moving picture coding section and a moving picture decoding section, wherein, the coding section comprises: a first predictor to output a first predictive signal by decimating pixels of a first reference picture used for prediction; a second predictor to output a second predictive signal by decimating pixels of a second reference picture used for prediction; a predictive subtracter to subtract a predictive signal from a coded picture signal to obtain a predictive residue signal, the predictive signal being formed by alternately selecting pixels not decimated of the first and the second predictive signals; and an encoder to encode the predictive residue signal and output the coded predictive residue signal, and the decoding section comprises: a decoder to decode the coded predictive residue signal to reproduce the predictive residue signal; a third predictor to output a third predictive signal by decimating pixels of a third reference picture used for prediction; a fourth predictor to output a fourth predictive signal by decimating pixels of a fourth reference picture used for prediction; a predictive adder to alternately select pixels not decimated of the third and the fourth predictive signals and add the selected pixels to the reproduced predictive residue signal to reproduce and output a picture signal.

Further the present invention provides a storage medium storing a moving picture coded signal obtained by interpicture prediction with a plurality of reference pictures to decimate pixels of a first and a second reference picture used for prediction to form a first and a second predictive signal, respectively, alternately select pixels not decimated of the first and the second predictive signals to form a predictive signal, subtract the predictive signal from a coded picture signal to obtain a predictive residue signal, and encode the predictive residue signal, the encoded predictive residue signal being stored therein.

Further, the present invention provides a moving picture coding method for performing inter-picture prediction with a plurality of reference pictures, comprising the steps of: outputting a first and a second predictive signal by decimating pixels of a first and a second reference picture used for prediction, respectively; alternately selecting pixels not decimated of the first and the second predictive signals to form a predictive signals; subtracting the predictive signal from a coded picture signal to obtain a predictive residue signal; and encoding the predictive residue signal to output thereof.

Further, the present invention provides a moving picture coding and decoding method for performing inter-picture prediction with a plurality of reference pictures, comprising the steps of: outputting a first predictive signal by decimating pixels of a first reference picture used for prediction; outputting a second predictive signal by decimating pixels of a second reference picture used for prediction; alternately selecting pixels not decimated of the first and the second predictive signals to form a predictive signals; subtracting the predictive signal from a coded picture signal to obtain a predictive residue signal; encoding the predictive residue signal and outputting the coded predictive residue signal; decoding the coded predictive residue signal to reproduce the predictive residue signal; outputting a third predictive signal by decimating pixels of a third reference picture used for prediction; outputting a fourth predictive signal by decimating pixels of a fourth reference picture used for prediction; and alternately selecting pixels not decimated of the third and the fourth predictive signals and adding the selected pixels to the reproduced predictive residue signal to reproduce and output a picture signal.

Further, the present invention provides a moving picture decoding apparatus for performing inter-picture prediction with a plurality of reference pictures comprising: a decoder to decode a coded predictive residue signal to reproduce a predictive residue signal; a first predictor to output a first predictive signal by decimating pixels of a first reference picture used for prediction; a second predictor to output a second predictive signal by decimating pixels of a second reference picture used for prediction; a predictive adder to alternately select pixels not decimated of the first and the second predictive signals and add the selected pixels to the reproduced predictive residue signal to reproduce and output a picture signal.

Further, the present invention provides a moving picture decoding method for performing inter-picture prediction with a plurality of reference pictures comprising the steps of: decoding a coded predictive residue signal to reproduce a predictive residue signal; outputting a first predictive signal by decimating pixels of a first reference picture used for prediction; outputting a second predictive signal by decimating pixels of a second reference picture used for prediction; and alternately selecting pixels not decimated of the first and the second predictive signals and adding the selected pixels to the reproduced predictive residue signal to reproduce and output a picture signal.

DETAILED DESCRIPTION OF THE PREFERRED EMBODIMENTS

Figure 4:
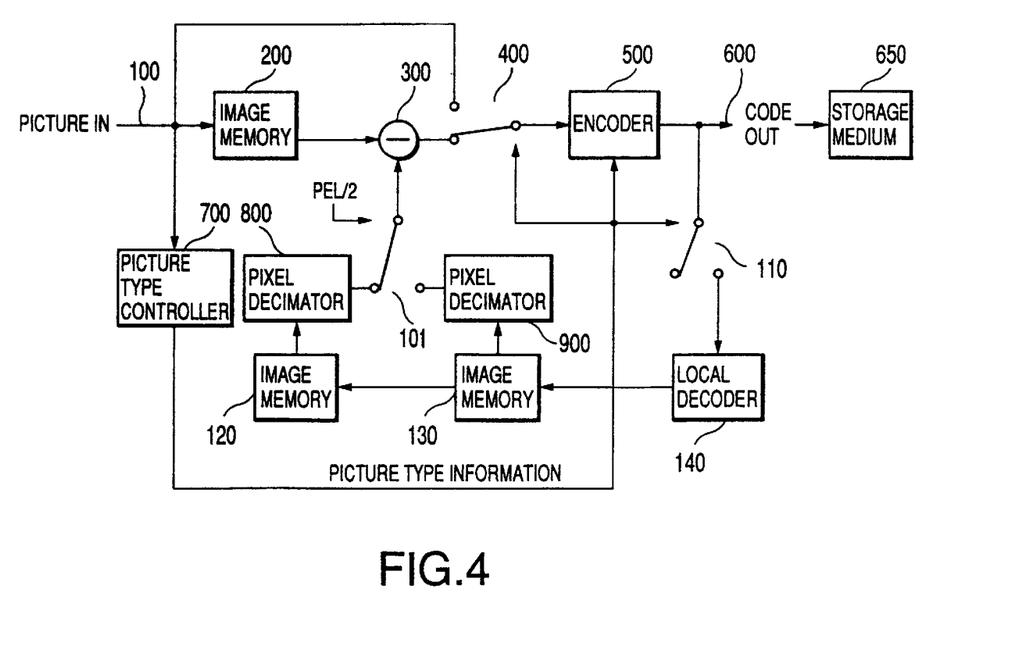
FIG. 4 shows a block diagram of a first embodiment of a coding apparatus according to the present invention.

FIG. 4 shows a block diagram of a first preferred embodiment of the moving picture coding apparatus according to the present invention.

Image (picture) signals of moving picture are sequentially supplied to an image memory 200, a switch 400 and a picture type controller 700 via input terminal 100.

The picture type controller 700 sets the picture type of each frame by a predetermined period in synchronism with the input frames. More in detail, an every Nth frame is set as the I frame and the others the B frames. The picture type controller 700 then outputs the picture type information to the switch 400, an encoder 500 and a switch 110.

The image memory 200 stores an image signal of B frame among the image signals to delay the image signal by (N−1) frames. The delayed image signal of B frame is then supplied to a predictive subtracter 300. The delay is performed in order that an I frame used for prediction must be coded by the encoder 500 prior to the B frames to be predicted.

The predictive subtracter 300 subtracts a predictive signal from the image signal of B frame supplied from the image memory 200 to produce a predictive residual signal that is supplied to the switch 400. The predictive signal is supplied from a switch 101 as described later.

Under the control by the picture type information, the switch 400 selects and supplies the input image signal of I frame or the predictive residual signal to the encoder 500.

The encoder 500 transforms the selected signal by discrete cosine transform (DCT) and quantizes it to produce a variable-length coded signal. The coded signal is then output via output terminal 600. The output coded signal can be stored in a storage medium 650, such as a disc-like storage medium.

In case of I frame, the coded signal of I frame is supplied to a local decoder 140 via switch 110 under the control of the picture type information.

The local decoder 140 performs deqauntization and inverse-DCT to the coded signal of I frame to reproduce the image signal of I frame that is supplied to an image memory 130.

The image memory 130 stores and holds the reproduced image signal of I frame by one I frame and outputs the image signal to an image memory 120 when the next reproduced image signal of I frame is supplied thereto. The image memory 120 also stores and holds the reproduced image signal of I frame by one I frame.

The image signals of I frame are supplied as reference picture signals to pixel decimators 800 and 900 from the image memories 120 and 130, respectively, when the B frames are predictive-coded. The pixel decimator 800 decimates every other pixel from the image signal of I frame to output an image signal of pixels the number of which is reduced half. The output image signal is supplied to the switch 101 as a first predictive signal. The pixel decimator 900 also decimates every other pixel from the image signal of I frame to output an image signal of pixels the number of which is reduced half. The output image signal is also supplied to the switch 101 as a second predictive signal.

The switch 101 is controlled per pixel to select alternately the pixels of the image signals from the pixel decimators 800 and 900 to output sequential predictive signals of pixels the number of which is the same as the pixels of the input image signals. The sequential predictive signals are then supplied to the predictive subtracter 300.

Figure 5:
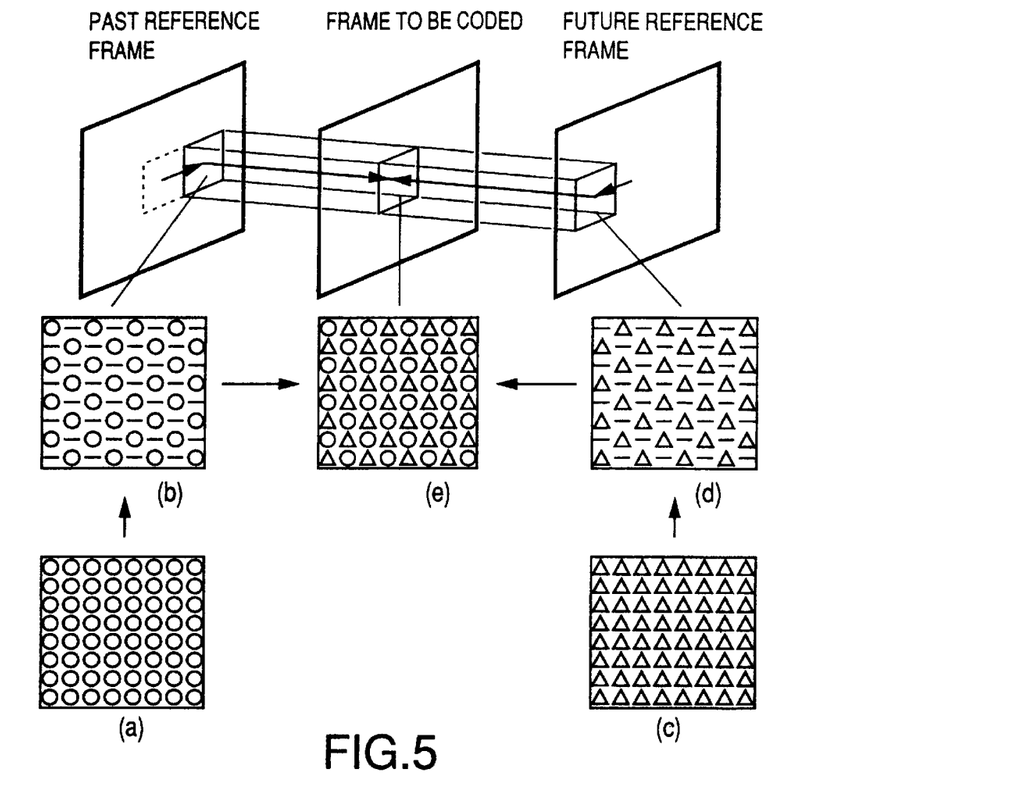
FIG. 5 illustrates predictive coding according to the present invention.

The above processing is illustrated in FIG. 5. In the drawing, the pixels of the image signal shown in FIG. 5(a) stored in the image memory 120 are decimated by the pixel decimator 800 as shown in FIG. 5(b). Further, the pixels of the image signal shown in FIG. 5(c) stored in the image memory 130 are decimated by the pixel decimator 900 as shown in FIG. 5(d). In the drawings, the symbols "○" and "Δ" indicate pixels not decimated and "–" decimated. And, as shown in FIGS. 5(b) and 5(d), the positions of pixel decimation are opposite to each other. Therefore, each of the sequential predictive signals output from the switch 100 shown in FIG. 5(e) has the same number of pixels as those of the image signals stored in the image memories 120 and 130 by alternately selecting the pixels from the image signals of FIG. 5(b) and 5(d).

The sequential predictive signals thus produced above involve folded components due to decimation at the upper half frequency components in the frequency band of the predictive signals. However, the lower half frequency components of the predictive signals are the same as those of the predictive signal produced in the coding apparatus of FIG. 2. The upper half frequency components are also the same as those of the predictive signal produced in the coding apparatus of FIG. 2 when the two reference pictures are the same as each other. However, if different, the difference will be an error.

Figure 6:
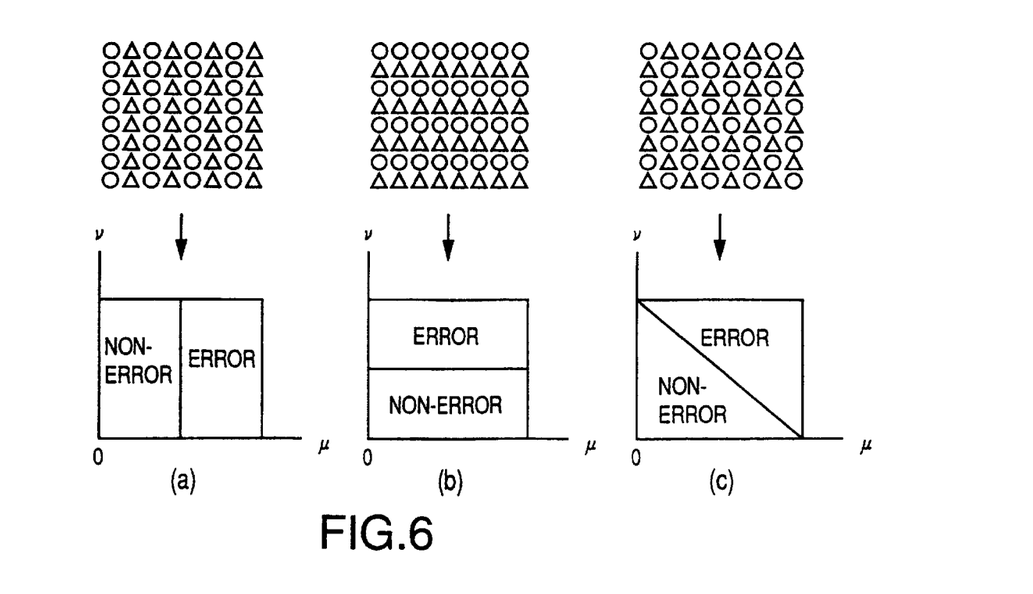
FIG. 6 illustrates pixel decimation according to the present invention.

Pixel decimation is illustrated in FIG. 6. FIGS. 6(a) and 6(b) show pixel decimation in the horizontal and vertical directions, respectively. Further, FIG. 6(c) shows pixel decimation where positions of the pixels to be decimated are reversed per raster line of the image signal. As shown in FIGS. 6(a) and 6(b), the frequency characteristics of the image signal after decimation reveal error components at the half of the frequency characteristics in the horizontal and vertical directions. In the case shown in FIG. 6(c), the frequency characteristics of the image signal after decimation reveals inclined portion where very high frequency components involve errors. However, these errors are visually hardly detected. In the drawings, "$\mu$" and "$\gamma$" indicate the horizontal and vertical frequencies, respectively.

Figure 7:
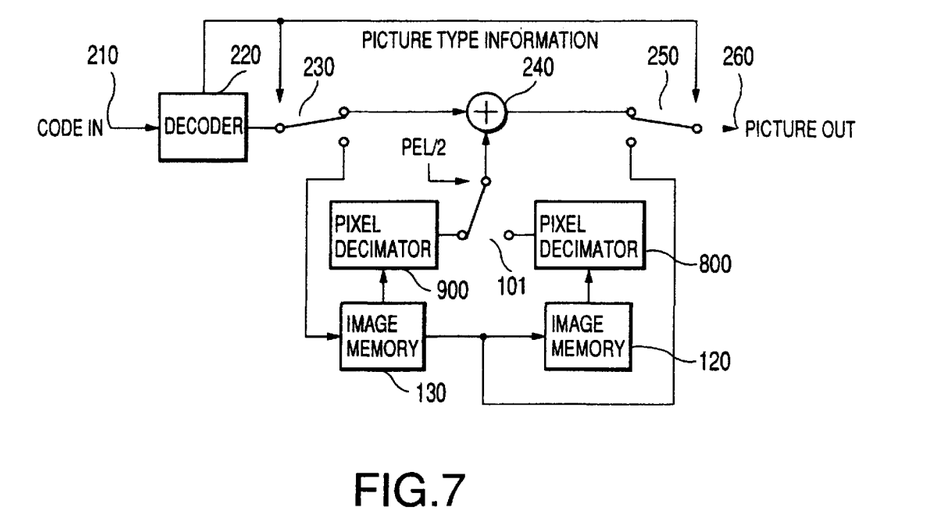
FIG. 7 shows a block diagram of a first embodiment of a decoding apparatus according to the present invention.

Next, FIG. 7 shows a first preferred embodiment of a decoding apparatus according to the invention that corresponds to the coding apparatus shown in FIG. 4. Elements shown in FIG. 7 that are the same or analogous to elements shown in FIG. 4 are referenced by the same reference numbers and will not be explained in detail.

In FIG. 7, a coded signal and prediction mode information, for instance, stored in the storage medium 650, are supplied to a decoder 220 via input terminal 210. The decoder 220 performs dequantization and inverse-DCT to the coded signal to reproduce and decode the image signal of I frame or predictive residual signal of B frames. The decoded signal is supplied to a switch 230. The prediction mode information is also decoded and supplied to the switch 230 and further to a switch 250.

Under the control of the predictive mode information, the switch 230 supplies the decoded image signal of I frame to the image memory 130.

The image memory 130 stores and holds the decoded image signal of I frame by one I frame and outputs the image signal to the image memory 120 and an switch 250 when the next decoded image signal of I frame is supplied thereto. The image memory 120 also stores and holds the image signal of I frame by one I frame.

The image signals of I frame are supplied as reference picture signals to the pixel decimators 800 and 900 from the image memories 120 and 130, respectively, when the B frames are predictive-decoded. The pixel decimator 800 decimates every other pixel from the image signal of I frame to output an image signal of pixels the number of which is reduced half. The output image signal is supplied to the switch 101 as a first predictive signal. The pixel decimator 900 also decimates every other pixel from the image signal of I frame to output an image signal of pixels the number of which is reduced half. The output image signal is also supplied to the switch 101 as a second predictive signal.

The switch 101 is controlled per pixel to select alternately the pixels of the image signals from the pixel decimators 800 and 900 to output sequential predictive signals of pixels the number of which is the same as the pixels of the input image signals. The sequential predictive signals are then supplied to a predictive adder 240 for predictive decoding of B frames.

The above processing by the pixel decimators 800 and 900 and the switch 101 are the same as those explained with reference to FIG. 5.

Under the control of the predictive mode information, the decoded predictive residual signal is also supplied to the predictive adder 240 via switch 230. The predictive residual signal and the predictive signal are added to each other by the predictive adder 240 to reproduce the image signal that is supplied to the switch 250.

Under the control of the predictive mode information, the switch 250 selects the image signal of I frame stored in the image memory 130 or the reproduced image signal from the predictive adder 240. The selected image signal is output via output terminal 260. Here, the output signal from the output terminal 260 is composed of frames, the frame order of which is returned to that of the image signal input to the coding apparatus of FIG. 4.

The decoding apparatus as described above with reference to FIG. 7 is to decode the coded signal output from the coding apparatus of FIG. 4. Not only this, the decoding apparatus of FIG. 7 can decode the coded signal output from the coding apparatus of FIG. 2. In this case, decoding errors would occur due to the difference of inter-picture prediction between the encoding and decoding apparatus shown in FIGS. 2 and 7. However, such errors can be visually ignored because the errors occur mostly in the high frequency components. Further, such errors will not be accumulated because B frames are predicted by non-cyclic prediction in which a frame already predicted is never used for another frame prediction.

The coding and decoding apparatus shown in FIGS. 4 and 7 can be united for portable use. In this case, image signals can be coded and stored in a storage medium, such as, a disc-like storage medium and reproduced promptly anywhere.

Figure 8:
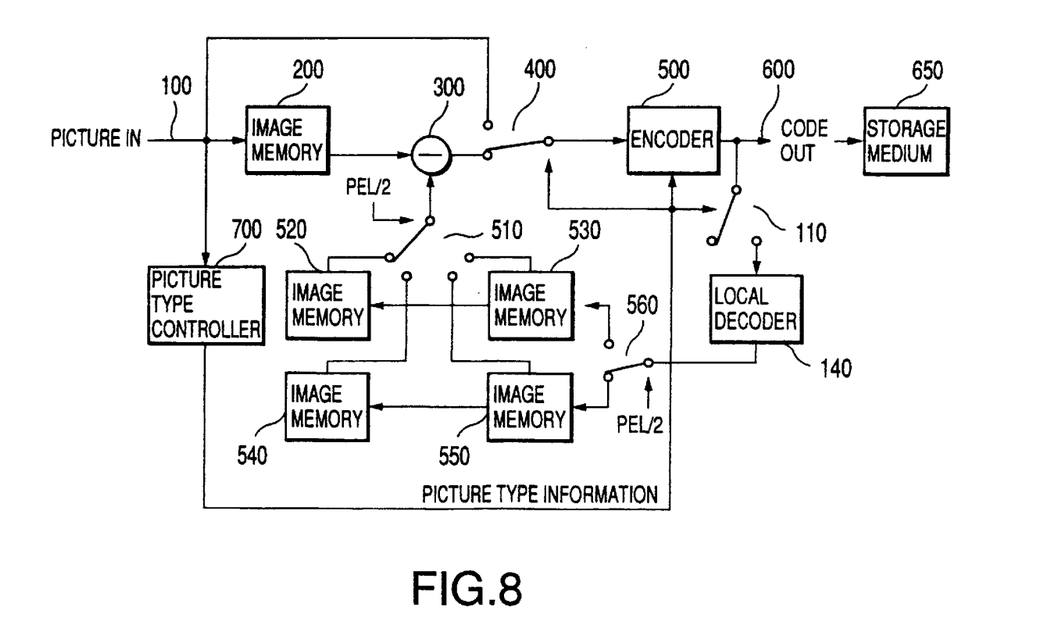
FIG. 8 shows a block diagram of a second embodiment of a coding apparatus according to the present invention.

Next, FIG. 8 shows a second preferred embodiment of a coding apparatus according to the invention. Elements shown in FIG. 8 that are the same or analogous to elements shown in FIG. 4 are referenced by the same reference numbers and will not be explained in detail.

The encoding apparatus of FIG. 8 is provided with a pixel switch 510, image memories 520 to 550 and a switch 560. The switch 510 has four contact points which is double compared to the pixel switch 101 shown in FIG. 4. On the other hand, each of the memories 520 to 550 is half in storage capacity compared to the memories 120 and 130 shown in FIG. 4.

The description of encoding process of an image signal of I frame through the image memory 200 to the encoder 500 is omitted here. Because it is the same as that described with reference to FIG. 4.

The coded image signal of I frame is reproduced by the local decoder 140 and supplied to the switch 560. The switch 560 alternately supplies the image signal pixel by pixel to the image memories 530 and 550. The switching operation is like a reverse operation of the switch 101 described with reference to FIG. 4.

The image memories 530 and 550 store a picture carried by the image signal the same as the image memory 130 of FIG. 4. However, since the amount of pixels supplied to each of the image memories 530 and 550 is half compared to the image memory 130 due to the switching operation of the switch 560, the size of stored picture is also half compared to the image memory 130.

The same as the image memory 130, the image memories 530 and 550 supply the pictures to the image memories 520 and 540, respectively, when a new reproduced I frame picture is supplied to the image memories 530 and 550.

The image memories 520 and 540 respectively store the half of the picture the same as the memories 530 and 550. As described above, a two-frame reference picture is stored in the four image memories 520 to 550, each storing a half frame.

The image signal is supplied to the pixel switch 510 as a predictive signal from the four image memories for B frame encoding. The switch 510 selects one of four pictures per pixel to produce a predictive signal the number of pixels of which is the same as that of the input picture.

In one frame, the number of pixels in reference frames before and after a frame to be predicted is the same as each other and decided to the former or the latter. Thus, in one frame, the switch 510 selects the pixels from the image memories 520 and 540 or the image memories 530 and 550. The image signal thus produced as the predictive signal is supplied to a predictive subtracter 300.

Figure 9A:
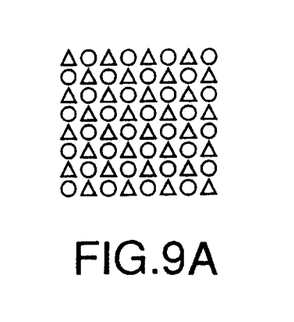
FIGS. 9A–C illustrate pixel selecting operation according to the present invention.
Figure 9B:
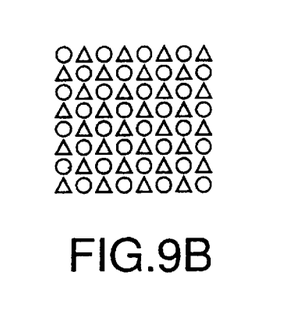
Figure 9C:
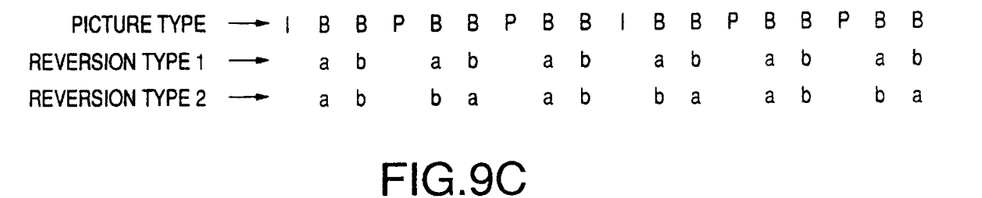

The switching operation of the switch 510 to select the pixels from the memories 520 and 540 or the memories 530 and 550 is reversed by frame as shown in FIG. 9. As shown in FIGS. 9A and 9B, there are two types of pixel decimation by the image memories. Further, there are two types of frame reversion as shown in FIG. 9C. In FIG. 9C, "a" and "b" indicate the decimation shown in FIGS. 9A and 9B, respectively. In this switching operation, only the frequency components high in time tend to involve errors in addition, and hence the errors are hardly detected.

The image signal thus coded as described as above is output via output terminal 600 and can be stored in a storage medium 650, such as a disc-like storage medium.

Figure 10:
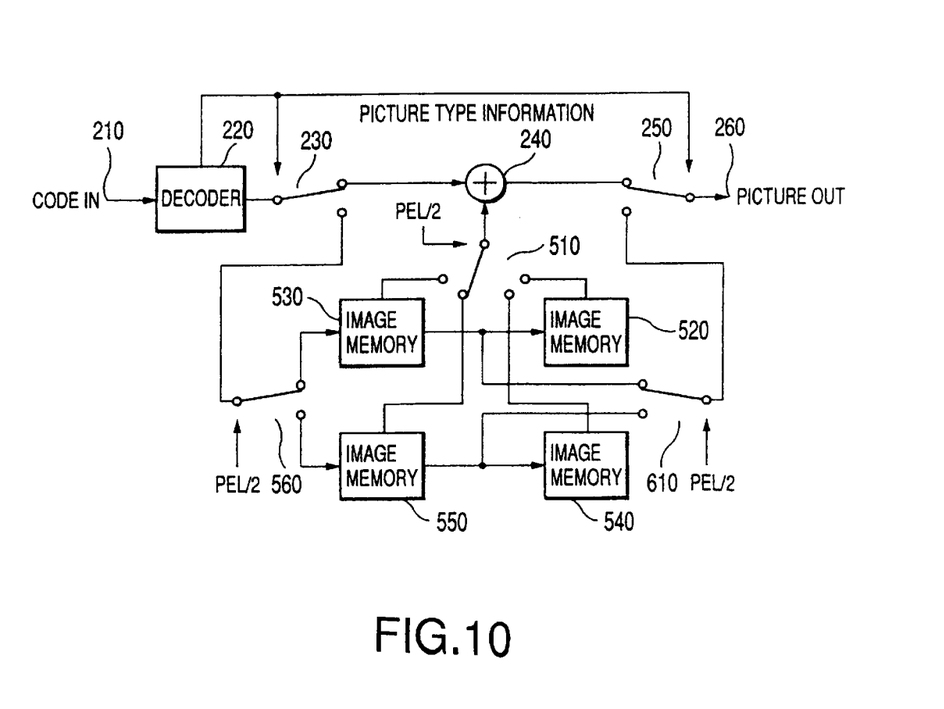
FIG. 10 shows a block diagram of a second embodiment of a decoding apparatus according to the present invention.

Next, FIG. 10 shows a second preferred embodiment of a decoding apparatus according to the invention that corresponds to the coding apparatus shown in FIG. 8. Elements shown in FIG. 10 that are the same or analogous to elements shown in FIGS. 7 and 8 are referenced by the same reference numbers and will not be explained in detail.

A picture reproduced the same as that described with reference to FIG. 7 is supplied to a switch 560. The operations of the image memories 520 to 550 and the switch 510 are the same as those described with reference to FIG. 8. Here, a reproduced picture of I frame is output via output terminal 260 via switches 610 and 250. The switch 610 operates synchronized with the switch 560 to return the pixels of the frame to the status before divided by the switch 560.

Figure 11:
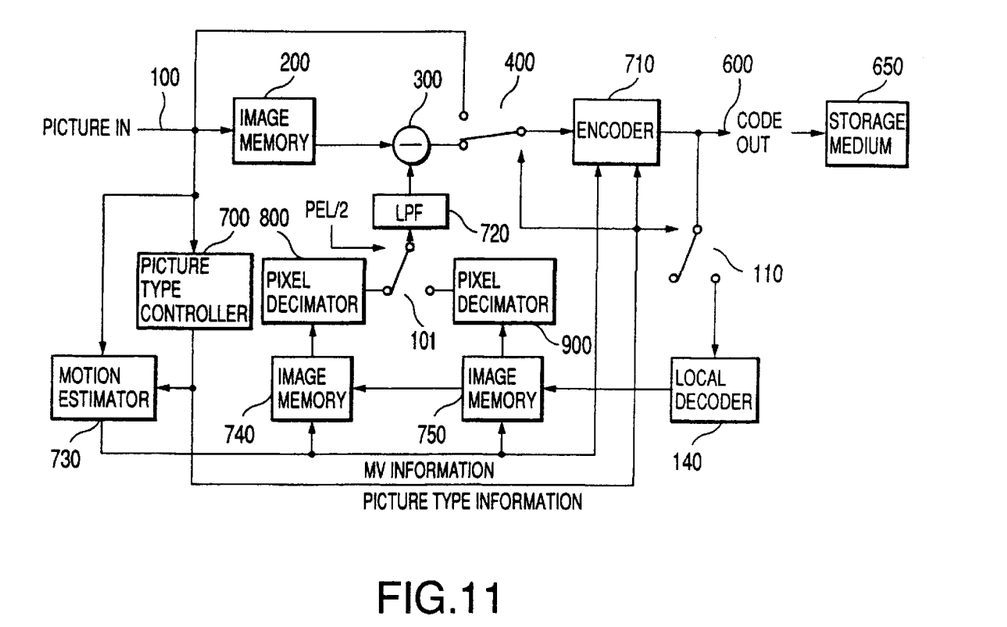
FIG. 11 shows a block diagram of a third embodiment of a coding apparatus according to the present invention.

Next, FIG. 11 shows a third preferred embodiment of a coding apparatus according to the invention. Elements shown in FIG. 11 that are the same or analogous to elements shown in FIG. 4 is referenced by the same reference numbers and will not be explained in detail.

The encoding apparatus shown in FIG. 11 is provided with a motion estimator 730, a spatial (low-pass) filter (LPF) 720 for motion compensation and predictive coding, and read address-changeable image memories 740 and 750.

An image (picture) signal is supplied to the picture type controller 700 and the motion estimator 730 via input terminal 100.

In response to the input image signal, the motion estimator 730 obtains motion vectors to be used for motion compensated inter-picture predictive coding. Further, based on the picture type information given by the picture type controller 700, the motion estimator 730 detects frame relationship in the inter-picture prediction to decide that the B frames are predictive frames and the I frames are the reference frames. The obtained motion vectors are supplied as motion vector (MV) information to the image memories 740 and 750. The MV information is further supplied to an encoder 710 that encodes the picture type information and the MV information and multiplexes them with the coded image signal.

The image memories 740 and 750 change the read addresses in accordance with the MV information and output motion-compensated reference pictures to the pixel decimators 800 and 900. The decimators 800 and 900 and the pixel switch 101 operate the same as those described with reference to FIG. 4.

The output sequential predictive signals of the pixel switch 101 are supplied to the predictive subtracter 300 via low-pass filter 720. The filter 720 restricts spatial frequency region of the folded portions that will cause errors by pixel decimation. The sequential predictive signals thus involve few frequency components in the frequency band of the folded portions. However, since there are few signal components in the frequency band, the predictive signals are similar to those produced by the encoding apparatus shown in FIG. 2.

Figure 12:
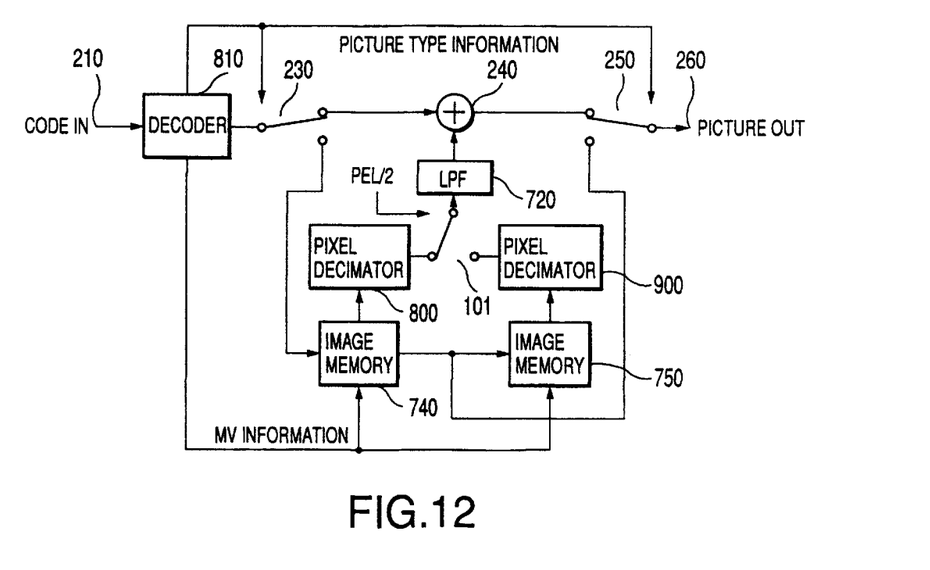
FIG. 12 shows a block diagram of a third embodiment of a decoding apparatus according to the present invention.

Next, FIG. 12 shows a third preferred embodiment of a decoding apparatus according to the invention that corresponds to the coding apparatus shown in FIG. 11. Elements shown in FIG. 12 that are the same or analogous to elements shown in FIGS. 7 and 11 are referenced by the same reference numbers and will not be explained in detail.

The decoding apparatus shown in FIG. 12 is provided with the spatial (low-pass) filter (LPF) 720 for motion compensation and predictive decoding and the read address-changeable image memories 740 and 750, and further a decoder 810 that decodes the coded signal and also the MV information.

The image memories 740 and 750 change the read addresses in accordance with the MV information supplied from the decoder 810. The output signal of the pixel switch 101 is supplied to the predictive adder 240 via low-pass filter 720 the same as described with reference to FIG. 11.

As described above, according to the present invention, pixels of two reference pictures are not added to each other but are alternately selected to produce a predictive signal in the inter-picture prediction. Thus, the pixels of a reference picture the number of which is the same as of the pixels of a picture to be encoded are only used for prediction. Therefore, a transfer rate of pixel data of a reference picture is made half compared to the conventional apparatus.

This makes possible inter-picture prediction using data transfer buses with low rate and few bits to reduce the cost of a disc-like storage medium or encoding and decoding apparatus.

Further, as described above, the present invention employs a low-pass filter to restrict the high frequency components of the sequential predictive signals. The error components are thus restricted to obtain a picture of a quality the same as the conventional apparatus.

Further, as described above, the encoding and decoding apparatus of the present invention can be united for portable use to promptly decode and reproduce image signals stored in a disc-like storage medium.

What is claimed is:

1. A moving picture coding apparatus for performing inter-picture prediction with a plurality of reference pictures, comprising:

a first predictor to output a first predictive signal by decimating pixels of a first reference picture used for prediction, pixels of the first predictive signal numbering half of pixels of a picture signal to be coded;

a second predictor to output a second predictive signal by decimating pixels of a second reference picture used for prediction, pixels of the second predictive signal numbering half of the pixels of the picture signal to be coded;

a predictive subtracter to subtract a third predictive signal from the picture signal to be coded to obtain a predictive residue signal, the third predictive signal being formed by alternately selecting the pixels not decimated of the first and the second predictive signals so that pixels of the third predictive signal are the same in number as the pixels of the picture signal to be coded; and an encoder to encode the predictive residue signal and output the coded predictive residue signal.

2. The moving picture coding apparatus according to claim 1, wherein each of the first and the second predictors comprises:

a first memory to store a half of the pixels after decimation of the reference picture and output the stored pixels as the respective predictive signal; and a second memory to store another half of the pixels and output thereof.

3. The moving picture coding apparatus according to claim 1, wherein, in the predictive subtracter, a positional relationship between the pixels used for predictive subtraction to generate the first and the second predictive signals are reversed by raster line, frame or fields.

4. The moving picture coding apparatus according to claim 1, wherein the predictive subtracter includes a spatial filter through which a low frequency component of the third predictive signal passes to suppress a frequency component of the third predictive signal that is a folded component other than a frequency band narrowed by the decimation, the third predictive signal that has passed through the spatial filter being subtracted from the picture signal to be coded.

5. A moving picture coding and decoding apparatus for performing inter-picture prediction with a plurality of reference pictures, comprising a moving picture coding section and a moving picture decoding section, wherein, the coding section comprises:

a first predictor to output a first predictive signal by decimating pixels of a first reference picture used for prediction. pixels of the first predictive signal numbering half of pixels of a picture signal to be coded;

a second predictor to output a second predictive signal by decimating pixels of a second reference picture used for prediction, pixels of the second predictive signal numbering half of the pixels of the picture signal to be coded;

a predictive subtracter to subtract a third predictive signal from the picture signal to be coded to obtain a predictive residue signal, the third predictive signal being formed by alternately selecting the pixels not decimated of the first and the second predictive signals so that pixels of the third predictive signal are the same in number as the pixels of the picture signal to be coded; and an encoder to encode the predictive residue signal and output the coded predictive residue signal, and the decoding section comprises:

a decoder to decode the coded predictive residue signal to reproduce the predictive residue signal;

a third predictor to output a fourth predictive signal by decimating pixels of a third reference picture used for prediction, pixels of the fourth predictive signal numbering half of pixels of the reproduced predictive residue signal;

a fourth predictor to output a fifth predictive signal by decimating pixels of a fourth reference picture used for prediction, pixels of the fifth predictive signal numbering half of the pixels of the reproduced predictive residue signal;

a predictive adder to alternately select the pixels not decimated of the fourth and the fifth predictive signals and add the selected pixels to the reproduced predictive residue signal to reproduce and output a picture signal.

6. A storage medium storing a moving picture coded signal obtained by inter-picture prediction with a plurality of reference pictures to decimate pixels of a first and a second reference picture used for prediction to form a first and a second predictive signal, respectively, pixels of each of the first and the second predictive signals numbering half of pixels of a picture signal to be coded, alternately select the pixels not decimated of the first and the second predictive signals to form a third predictive signal so that pixels of the third predictive signal are the same in number as the picture signal to be coded, subtract the third predictive signal from the picture signal to be coded to obtain a predictive residue signal, and encode the predictive residue signal, the encoded predictive residue signal being stored therein.

7. A moving picture coding method for performing inter-picture prediction with a plurality of reference pictures, comprising the steps of:

outputting a first and a second predictive signal by decimating pixels of a first and a second reference picture used for prediction, respectively, pixels of each of the first and the second predictive signals numbering half of pixels of a picture signal to be coded;

alternately selecting the pixels not decimated of the first and the second predictive signals to form a third predictive signal so that pixels of the third predictive signal are the same in number as the pixels of the picture signal to be coded;

subtracting the third predictive signal from the picture signal to be coded to obtain a predictive residue signal; and encoding the predictive residue signal to output thereof.

8. A moving picture coding and decoding method for performing inter-picture prediction with a plurality of reference pictures, comprising the steps of:

outputting a first predictive signal by decimating pixels of a first reference picture used for prediction, pixels of the first predictive signal numbering half of pixels of a picture signal to be coded;

outputting a second predictive signal by decimating pixels of a second reference picture used for prediction, pixels of the second predictive signal numbering half of the pixels of the picture signal to be coded;

alternately selecting the pixels not decimated of the first and the second predictive signals to form a third predictive signal so that pixels of the third predictive signal are the same in number as the pixels of the picture signal to be coded;

subtracting the third predictive signal from the picture signal to be coded to obtain a predictive residue signal;

encoding the predictive residue signal and outputting the coded predictive residue signal;

decoding the coded predictive residue signal to reproduce the predictive residue signal;

outputting a fourth predictive signal by decimating pixels of a third reference picture used for predictions, pixels of the fourth predictive signal numbering half of pixels of the reproduced predictive residue signal;

outputting a fifth predictive signal by decimating pixels of a fourth reference picture used for prediction, pixels of the fifth predictive signal numbering half of the pixels of the reproduced predictive residue signal; and alternately selecting the pixels not decimated of the fourth and the fifth predictive signals and adding the selected pixels to the reproduced predictive residue signal to reproduce and output a picture signal.

9. A moving picture decoding apparatus for performing inter-picture prediction with a plurality of reference pictures comprising:

a decoder to decode a coded predictive residue signal to reproduce a predictive residue signal;

a first predictor to output a first predictive signal by decimating pixels of a first reference picture used for predictions, pixels of the first predictive signal numbering half of pixels of the reproduced predictive residue signal;

a second predictor to output a second predictive signal by decimating pixels of a second reference picture used for prediction, pixels of the second predictive signal numbering half of the pixels of the reproduced predictive residue signal; and a predictive adder to alternately select the pixels not decimated of the first and the second predictive signals to produce a third predictive signal, pixels of the third predictive signal being the same in number as the pixels of the reproduced predictive residue signal, and add the third predictive signal to the reproduced predictive residue signal to reproduce and output a picture signal.

10. A moving picture decoding method for performing inter-picture prediction with a plurality of reference pictures comprising the steps of:

decoding a coded predictive residue signal to reproduce a predictive residue signal;

outputting a first predictive signal by decimating pixels of a first reference picture used for prediction, pixels of the first predictive signal numbering half of pixels of the reproduced predictive residue signal;

outputting a second predictive signal by decimating pixels of a second reference picture used for prediction, pixels of the second predictive signal numbering half of the pixels of the reproduced predictive residue signal; and alternately selecting the pixels not decimated of the first and the second predictive signals and adding the selected pixels to the reproduced predictive residue signal to reproduce and output a picture signal.

* * * * *